Aug. 28, 1956      C. J. YARRICK      2,761,041

AUXILIARY AND LATCHED CONTACT SWITCHES

Filed June 24, 1953      7 Sheets-Sheet 1

*INVENTOR.*
CHARLES J. YARRICK
BY
ATTORNEYS.

Aug. 28, 1956  C. J. YARRICK  2,761,041
AUXILIARY AND LATCHED CONTACT SWITCHES
Filed June 24, 1953  7 Sheets-Sheet 2

*INVENTOR.*
CHARLES J. YARRICK
BY
ATTORNEYS

Aug. 28, 1956   C. J. YARRICK   2,761,041
AUXILIARY AND LATCHED CONTACT SWITCHES
Filed June 24, 1953   7 Sheets-Sheet 3

FIG. 7

INVENTOR.
CHARLES J. YARRICK
BY
Ostrolenk & Faber
ATTORNEYS

Aug. 28, 1956     C. J. YARRICK     2,761,041
AUXILIARY AND LATCHED CONTACT SWITCHES
Filed June 24, 1953     7 Sheets-Sheet 4

INVENTOR.
CHARLES J. YARRICK
BY
Ostrolenk & Faber
ATTORNEYS

Aug. 28, 1956                    C. J. YARRICK                    2,761,041
                    AUXILIARY AND LATCHED CONTACT SWITCHES
Filed June 24, 1953                                    7 Sheets-Sheet 5

INVENTOR.
CHARLES J. YARRICK
BY
Ostrolenk & Faber
ATTORNEYS

Aug. 28, 1956  C. J. YARRICK  2,761,041
AUXILIARY AND LATCHED CONTACT SWITCHES
Filed June 24, 1953  7 Sheets-Sheet 6

*INVENTOR.*
CHARLES J. YARRICK
BY
Ostrolenk & Faber
ATTORNEYS

2,761,041
AUXILIARY AND LATCHED CONTACT SWITCHES

Charles J. Yarrick, West Collingswood, N. J., assignor to I-T-E Circuit Breaker Company, Philadelphia, Pa.

Application June 24, 1953, Serial No. 363,744

17 Claims. (Cl. 200—153)

My invention relates to an auxiliary switch and is more particularly directed to a novel multiple switching means which can be adapted for use with automatic circuit interrupters.

In the operation of automatic circuit protective equipment, it is usually necessary and desirable to energize auxiliary circuits depending on the position of the co-operating contacts of the circuit breaker. Thus, for example, when the circuit breaker is automatically moved from the closed to the open position due to automatic trip, it is desirable to energize an alarm circuit so as to appraise personnel-in-charge that a fault or over current occurred and/or exists in a particular circuit. Also, the automatic interruption of a first electrical circuit by means of a circuit breaker may require the operation of other protective equipment and hence, it is necessary to provide an auxiliary switch on the first circuit breaker which will be instrumental in energizing the auxiliary protective circuit equipment when the first circuit breaker is opened.

Many other additional circuits frequently must be energized to indicate the position of the contacts on the circuit breaker. Thus, for example, in most switch board installations, it is customary to have flashing red and green lights, which are energized through the auxiliary switch of the circuit breaker, to indicate to the maintenance personel whether a particular circuit breaker is open or closed.

Accordingly, the purpose of my invention is to provide an auxiliary switch for a circuit breaker which will be responsive to the position of the circuit breaker and thus energize appropriate circuits to indicate whether the circuit breaker is open or closed. That is, the auxiliary switch of my invention has a plurality of contacts which may be individually connected to control such circuits as an alarm ringer in the event of automatic trip, excitation of additional protective equipment, etc.

The auxiliary switch of my invention is provided with four electrically independent circuits each of which has double break. My novel auxiliary switch which is complete with four contact units can be mounted on the rear of a circuit breaker escutcheon plate and properly connected to the circuit breaker so that it is actuated as a result of the movement of the cooperating contacts thereof. The location of the auxiliary switch on the escutcheon plate and adjacent to the circuit breaker handle is a very conveniently desirable arrangement since the visual target actuator and the auxiliary switch actuator can be one and the same piece.

The auxiliary switch comprises a molded Bakelite base having a plurality of channels and recesses in which the plurality of terminal and contact members can be side mounted. A single cam shaft drives two independent cams, each in turn drives an associated contact arm. Each of the two contact arms within a single unit of my auxiliary switch may be provided with a bridging contact at each end thereof. Hence, a single cam will be effective to control two independent bridging members. Since the position of the plurality of contacts are controlled through the two contact arms by means of cams driven through a cam shaft, I am able to provide a positive drive for both the opening and the closing of the auxiliary circuits. That is, no biasing means is required to maintain the plurality of contacts in their normal position since the drive is achieved through cam operation both for opening and closing the auxiliary contacts and thus, it is possible to achieve positive drive.

By providing a cam operated auxiliary switch in which the contact arms require no biasing means and have their movement restricted to linear motion, I am able to provide a unit which is compact, easy to assemble and economical to manufacture. Furthermore, since a single operating cam shaft can operate the four contacts existing in one layer of a unit of my auxiliary switch, the units can be adapted for use in multiples of four contacts by stacking several layers of switches and operating all of them from a single cam shaft.

My novel switch also has the advantage of being extremely flexible in its adaptability for use in all types of circuit arrangements. Thus, for example, the four contacts provided within a single unit can be used to control only two circuits and thereby provide four independent breaks or interruptions for each circuit. That is, since each contact within the unit is a bridging member having double break, it is possible to connect two switch contacts in series and thereby provide four independent interruptions for each circuit. Hence, if it is necessary to control a 125 volt D. C. circuit which is required to carry 4 amperes, a single contact with its double break will be sufficient to interrupt and close the load. However, it is necessary to control an auxiliary circuit of comparable D. C. voltage which carries for example 10 amperes, then the switch can be readily adapted so that two contacts are connected in series to provide four independent breaks for this higher ampere circuit.

Additional flexible features of my novel auxiliary switch are achieved by the novel manner in which the bridging contacts are secured to the contact arm. The bridging contacts are removably positioned within a recess at the ends of the contact arms and biased toward their cooperating contacts by means of a spring which is housed within the same recess. Thus, by a simple manipulation, the bridging contact can be positioned either in front of or behind the spring to render it either a normally opened or a normally closed switch.

Since all of the contacts of my novel switch are interchangeable, the assembly thereof is relatively simple and enables the user thereof to readily adapt the unit for any combination of contacts. That is, the unit may have two normally open and two normally closed contacts, three normally open or three normally closed contacts, or four normally open or four normally closed contacts.

The removable and interchangeable bridging contacts used in the auxiliary switch are made with a silver inlay instead of contact buttons to minimize on manufacturing costs and save space within the switch to enable the unit to be compact. In addition to this feature, the bridging contact is provided with two protruding contact sections which permit a wiping action for each contact engagement to insure that the contact surfaces are self-cleaned.

Thus, the auxiliary switch of my invention consists of a molded Bakelite base cover which can be a complete unit within the dimensions of 4x4x¾". The bus cover moldings may be raised on flat surfaces near the terminal connections for easy and positive identification of the contacts.

The auxiliary switch is a four contact switch unit in which each contact has double break. If double break circuit is required, four independent breaks are obtainable. The four contacts may be operated from the target actuator through a gear to operate a pair of cams mounted on a cam shaft of the switch in which each cam operates a pair of contacts.

Accordingly, a primary object of my invention is to provide a novel auxiliary switch arrangement which is readily and easily re-assembled so that it can be adapted for all types of circuit control use.

Another object of my invention is to provide auxiliary means which is responsive to the position of the cooperating contacts of a circuit breaker.

Another object of my invention is to provide means which can energize or de-energize auxiliary circuits depending on whether its associated circuit interrupter is in the open or closed position.

Another object of my invention is to provide a simple and compact auxiliary switching unit in which all of the parts can be side mounted in appropriate grooves and recesses of a molded Bakelite base.

Another object of my invention is to provide an auxiliary switch which has four electrically independent circuits wherein each circuit has double break.

A still further object of my invention is to provide a novel auxiliary switch which is flat and compact so that it may be mounted on the escutcheon plate and adjacent to a circuit breaker handle so that the visual target actuator may also actuate the auxiliary switch.

Still another object of my invention is to provide switching means for auxiliary circuits which can be readily adapted to provide four independent circuit interruptions for two independent auxiliary circuits.

A still further object of my invention is to provide a cam operated switching means which has positive drive for both the opening and closing of the plurality of switches and eliminates the necessity of a biasing means for the contact arms.

Another object of my invention is to provide a compact auxiliary switch in which the cam and cam shaft are keyed to each other so as to prevent improper alignment during assembly.

Still another object of my invention is to provide a switching means in which a single operating shaft can operate through a plurality of cams to simultaneously operate a plurality of contacts.

Another object of my invention is to provide a novel contact arm and control therefor in connection with auxiliary switches so that controlled contacts can be either normally open or normally closed by simple re-assembly procedure.

Still another object of my invention is to provide an auxiliary switch in which the contact arms have only linear movement with no arc plate movement to thereby permit a four contact arrangement to be provided within a flat compact molded structure.

Another object of my invention is to provide auxiliary switch units containing four contacts per layer which may be assembled in multiples of four contacts by stacking one layer on another and operating all of the units from a single operating cam shaft.

A still further object of my invention is to provide novel inlaid silver bridging contacts which have rolling motion during contact engagement to provide wiping and self-cleaning of the contacting surfaces.

The novel switch of my invention may be provided with latched contacts so that the switch can properly indicate to an alarm ringing circuit whether the circuit breaker has been opened by automatic trip or other means. That is, since most circuit breakers are provided with three separate means to separate the contacts, it is desirable to inform the maintenance personnel of the manner in which the protective equipment has been opened. Thus, for example, if the circuit breaker has been automatically tripped due to fault or over current condition, it is desirable to immediately appraise the maintenance personnel of the fault conditions existing on the electric line and hence, necessary to energize the alarm ringing circuit when the breaker opens under these conditions. However, if the circuit breaker is intentionally opened by means of manual operation of the handle or by automatic shunt trip, it would be undesirable to have the alarm ringing circuit energized since it would be misleading to maintenance personnel.

I have provided a novel attachment for my auxiliary switch by which the control of the contacts operating the alarm ringing circuit can be rendered independent and ineffective when the circuit breaker is intentionally opened by means of manual operation of the handle or by automatic shunt trip. In this arrangement, a spring loaded latch is set up when rotating the operating handle to close the breaker. However, when the handle is reversed to the trip position or the shunt trip coil is energized, the latch will be effective to reset the cam controlling the alarm ringing circuit.

The arrangement is as follows: A separate cam shaft is provided for the cam operating the alarm ringing circuit. When the circuit breaker is moved to the closed position, a spring loaded latch is brought into engagement so that the operating shaft for the alarm ringing circuit and the operating shaft for the remaining circuits are latched together. If the circuit breaker is automatically tripped to the open position, the spring loaded latch remains latched and hence, both operating cam shafts will operate simultaneously.

The driving force for the auxiliary switch will be transmitted from the operating cam shaft through the spring loaded latch to the operating cam shaft of the alarm ringing circuit. However, if the circuit breaker is either manually opened by means of the handle or automatically opened by means of the shunt trip coil, the spring loaded latch will be disengaged and hence, even though the main cam operating shaft is rotated by the operation of the circuit breaker, the operating cam shaft for the alarm ringing circuit will remain stationary. That is, since the two operating shafts are linked together through the spring loaded latch, the alarm ringing circuit can be rendered independent of the operation of the auxiliary switch when the spring loaded latch is unlatched. Hence, by providing means to unlatch the spring loaded latch whereby the circuit breaker is either manually opened or automatically opened through the shunt trip, it is possible to insure the non-operation of the alarm ringing circuit and thereby prevent misleading information from being transferred to the maintenance personnel.

This arrangement insures that the alarm ringing circuit will be energized when the circuit breaker is automatically tripped due to a fault over current.

It will be noted that the latch contact switch, above mentioned, is of identical construction to the auxiliary switch heretofore described and merely requires a simple spring loaded latch arrangement to be adapted to the auxiliary switch.

Accordingly, a further object of my invention is to provide a novel latch contact auxiliary switch which can not only be coordinated with auxiliary circuits to indicate the position of its associated circuit breaker but can also indicate the manner in which the circuit breaker has been opened.

Another object of my invention is to provide a spring loaded latch attachment for an auxiliary switch in which the operating cam shaft for the alarm ringing circuit may be driven by the operating cam shaft of the remaining auxiliary circuits when the circuit breaker is automatically tripped through a fault current. By a novel latch control means, the operating cam shaft for the alarm ringing circuit can be rendered ineffective and independent from the remaining portion of the switch to thereby maintain the alarm ringing circuit in a de-energized condition when the circuit breaker is intentionally opened by means of the manual operation of the handle and energization of the shunt trip coil.

Still another object of my invention is to provide a spring loaded latch attachment for an auxiliary switch which is automatically reset during the reclosing operation of the circuit breaker after it has been intentionally opened.

These and other objects of my invention will be apparent from the following description when taken in connection with the drawings in which.

Figure 11:
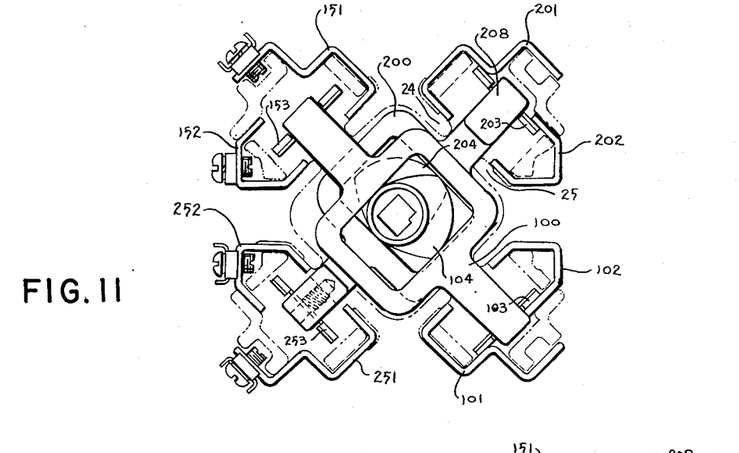
Figure 11 is a side view of the operating parts of the auxiliary switch illustrating their position when the circuit breaker is closed. In this figure, the bridging contacts are initially positioned in the same manner as the bridging contacts of Figure 1. A comparison of this figure with Figure 1 illustrates the change in position of the various operating parts of the switch when the circuit breaker is moved from the open to the closed position.
Figure 19:
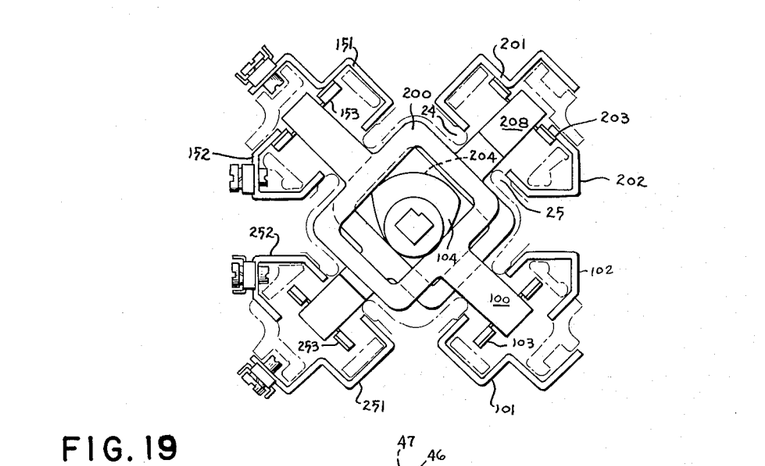
Figure 19 is a view of the position of the various parts of my auxiliary switch after the circuit breaker has been intentionally opened by either the operating handle or by shunt trip means.
Figure 20:
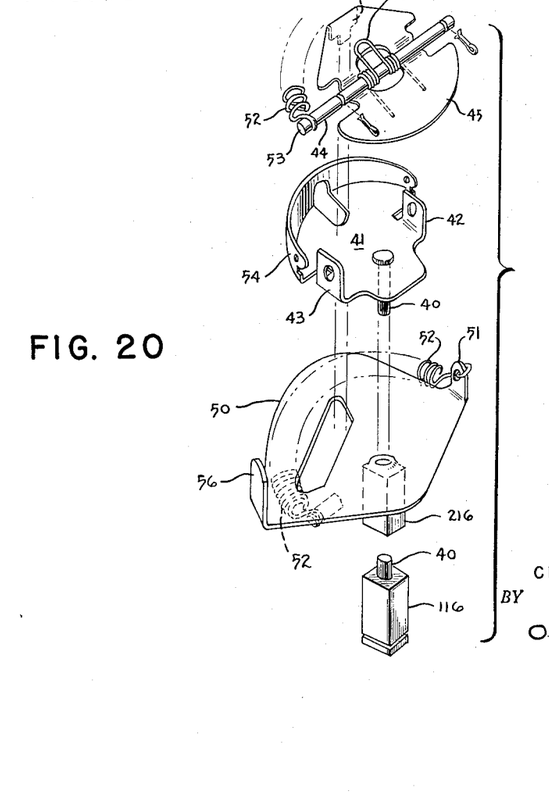
Figure 20 is a perspective view of the spring loaded attachment which may be used with the auxiliary switch to provide latch contacts.

A comparison of Figures 11 and 19, the former of which indicates the position of the parts when the circuit breaker is in a closed position, illustrates the contacts which are rendered ineffective when the circuit breaker is intentionally opened. A comparison of Figures 1 and 19, respectively, illustrates the position of the operating parts of the auxiliary switch when the circuit breaker is automatically tripped (Figure 1) and when the circuit breaker is intentionally opened (Figure 19).

Figures 1 through 7 illustrate my novel auxiliary switch and the various components thereof.

A housing comprising a molded Bakelite base 10 is provided with a plurality of angular channels 11, 12 and recesses such as 13 and 14 to receive the various components of the switch such as the terminal members 101, 102, 151, 152, 201, 202, 251 and 252. Thus, for example, the terminal member 151, seen in Figure 7, can be side mounted in the angular channel member 11, seen in Figure 6, to comprise the assembly units, seen in Figure 1. In like manner, the companion terminal 152 of Figure 7 can be mounted in the channel 12, 12' of Figure 6 to create the assembly unit seen in Figure 1. The remaining terminal members are side mounted in the switch in a similar manner. It will be noted that the terminal members comprise the stationary contacts with which the bridging contact members cooperate.

Figure 1:
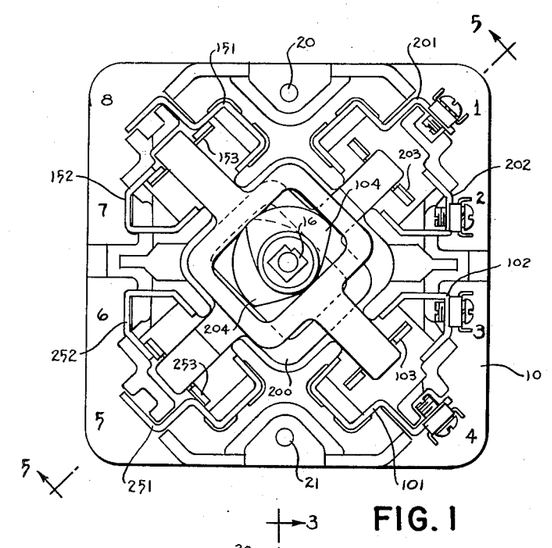
Figure 1 is a side view of my novel auxiliary switch with all of the components in position and the cover removed therefrom. This figure indicates the position of the various components when the circuit breaker is in an opened position.

The two contact arms 100 and 102 are mounted in the recesses such as 13 and 14 to comprise the assembly unit seen in Figure 1. Also, the cam members 104 and 204 are positioned within the rectangular openings of the contact arms 100 and 200 and thereby seated in the recess area indicated by the numeral 13. A keyed operating shaft 16 is passed through the opening 18 of the molded base 10 and cooperates with the keys of cams 104 and 204. As will hereinafter be apparent, the key arrangement on cam operating shaft 16 is provided so that improper assembly of the cams 104 and 204 thereon is impossible.

After the various components have been side mounted within the molded base 10, a flat cover 19 is positioned on the back of the auxiliary switch to maintain the various side mounted components within the switch.

Figure 8:
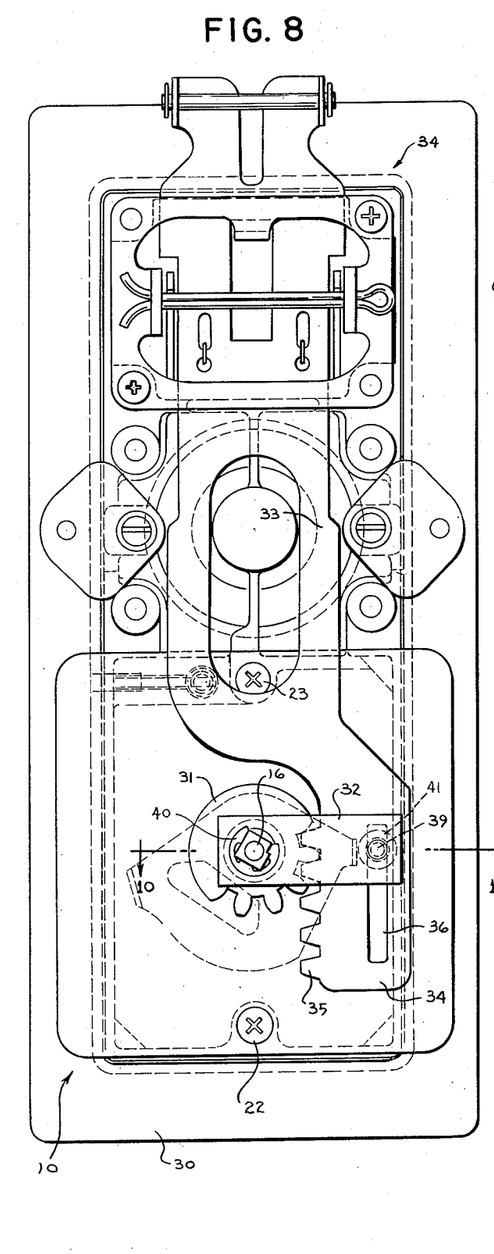
Figure 8 is a back view illustrating the adaption of my novel auxiliary switch to an escutcheon of a circuit breaker. This figure merely illustrates one manner in which the auxiliary switch can be adapted to coordinate with circuit protective equipment. This figure illustrates the position of the various parts when the circuit breaker is in the closed position.

Appropriate openings 20 and 21 in the base 10 may be provided to receive the screws 22 and 23 which pass through openings in the flat cover 19 so that the entire switch arrangement can be secured to a base or escutcheon plate as seen in Figure 8.

It will be noted that the set of terminal members 101, 151 and 201, 251 are identical in configuration and hence, are not only removable and replaceable but are also interchangeable. In like manner, the second set of terminal members 102, 152 and 202, 252 are not only removable and replaceable but are also interchangeable within the switch.

Hence, for the manufacturing and assembly, only two sets of terminal members are required to thereby reduce the cost of the switch and render more efficient the arc plate thereof.

It will also be noted that the two contact arms 100, 200 as well as cams 104, 204 are identical in construction and hence, are interchangeable. The bridging contacts 103, 153 and 203, 253 are positioned within appropriate recesses of the contact arms 100, 200, as will hereinafter be more fully described, to provide bridging contacts to complete the circuit from one terminal to another such as from terminal 151 to terminal 152 as seen in Figure 1. Since the contact arms 100, 200 as well as the cams 104, 204 are maintained by the flat cover 19, their movement is restricted to planar movement.

Figure 6:
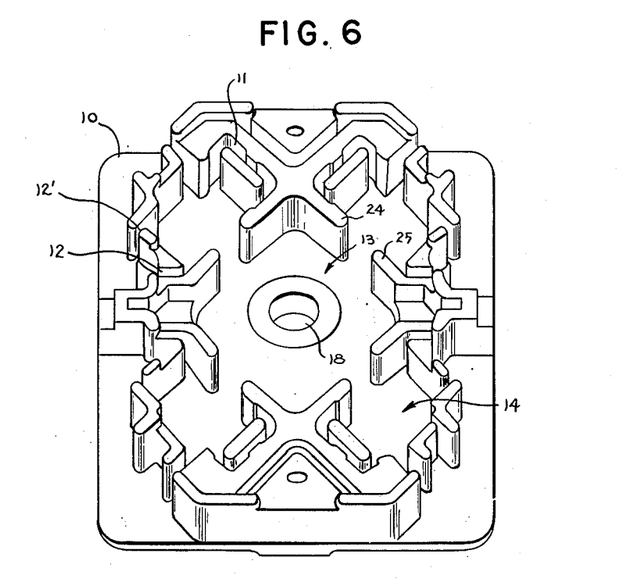
Figure 6 is a perspective view of the Bakelite molded base of my auxiliary switch and illustrates the plurality of channels, grooves and recesses into which the various operating parts of the switch may be side mounted.

It will be noted that the extending arms such as 104, 154 and 204, 254 of the contact arms 100, 200 are positioned between guides 24 and 25 (Figure 6). Hence, since the flat cover 19 restricts the movement of the contact arms 101 and 102 to planar movement and since the guides, which are an integral part of molded base 10, restrict the movement of the contact arms to linear motion, the contact arms 101, 102 will have oscillatory rectilinear movement. However, since no comparable guides are provided for the cams 104, 204, these members will have rotational movement within the plane containing their respective associated contact arms 100, 200.

It will be noted that contact containing means 108, 158 and 208, 258 are positioned at the outer ends, respectively, of the arms 105, 155 and 205, 255 and the contact arms 100, 200.

Figure 7:
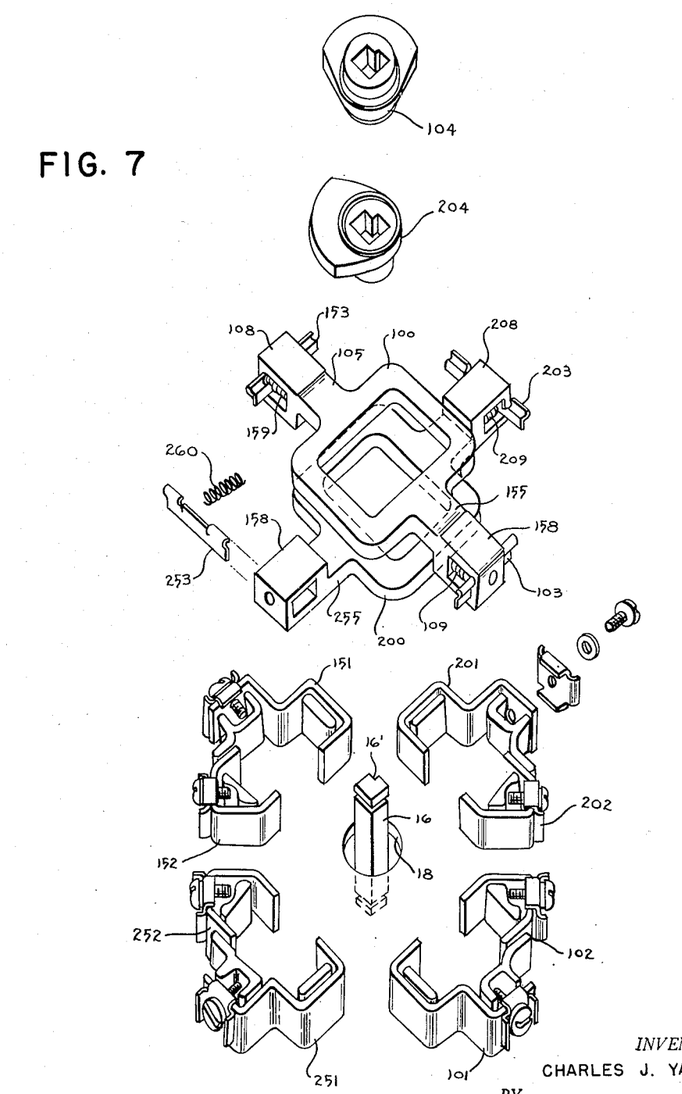
Figure 7 is an exploded perspective view of the various components such as the cams, operating cam shaft, contact arms, terminals, etc., which are side mounted in the various recesses and grooves of the Bakelite molded base of Figure 6 to result in the arc plate construction shown in Figure 1.

As will be best noted in the exploded perspective view of Figure 7, the contact containing sections 208, 258 extend upwardly and the contact containing sections 108, 158 extend downwardly. Hence, even though the contact arms 100 and 200 are restricted to recti-linear movement within their own planes, the upwardly extending sections 208, 258 from the lower contact arm 200 and the downwardly extending sections 108, 158 from the upper contact arm 100 will enable the bridging contacts 103, 153 and 203, 253 to be positioned in one plane.

Figure 2:
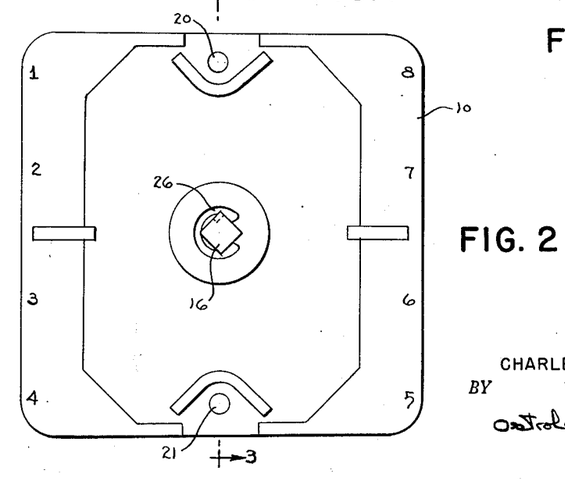
Figure 2 is a back view of the auxiliary switch of Figure 1 and is taken along the line 2—2 of Figure 3.
Figure 3:
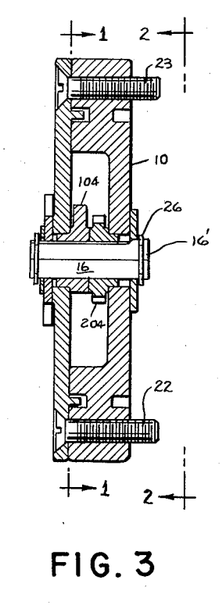
Figure 3 is a cross-sectional view of my novel auxiliary switch and is taken along the line 3—3 of Figure 2.
Figure 4:
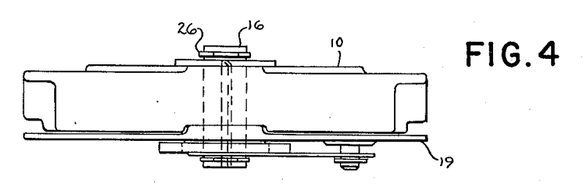
Figure 4 is an end view of my auxiliary switch.

As will hereinafter be more fully described, the cam operating shaft 16 is provided with driving means. This cam is prevented from having movement perpendicular to the switch by means of E ring 26. That is, after the various components are positioned within the molded base 10, the shaft 16 may be urged through the appropriate openings of the cam members 104, 204 and then secured in position by E ring 26 which fits into appropriate grooves of the cam operating shaft 16, as seen in Figures 2, 3 and 4.

The auxiliary switch is primarily adapted for use in connection with circuit breakers and is to be actuated thereby. Hence, the switch has a first position which corresponds to the open position of the circuit breaker and a second position which corresponds to the closed position of the circuit breaker.

Figure 1 illustrates the position of the various componenst when the circuit breaker is in an open position, that is, the first position of the switch. In this arrangement, the bridging contact 105 is in engagement with the terminal members 151, 152 and the bridging contact 253 is in engagement with the terminal members 251, 252. As is well known in the art, those contacts which are normally closed when the circuit breaker is open are referred to as "B" contacts. The "B" contacts are opened when the circuit breaker is closed. The remaining contacts comprising the bridging contact 103 and its associated terminal members 101, 102 and bridging contact 203 and its associated terminal members 201, 202 are not in engagement when the auxiliary switch is in the first or circuit breaker open position as seen in Figure 1. Those contacts which are normally open when the circuit breaker is closed are referred to as the "A" contacts. The "A" contacts are open when the circuit breaker is open.

Figure 5:
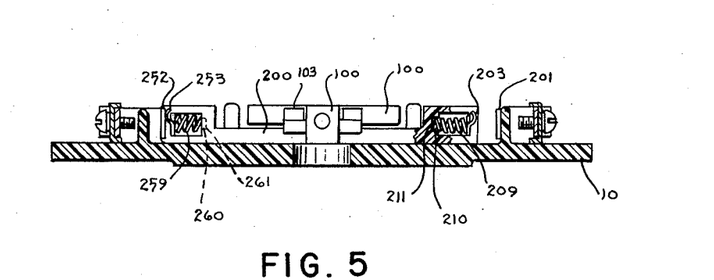
Figure 5 is a cross-sectional view taken in the direction of the arrows 5—5 of Figure 1.

Thus, it will be seen from Figure 1 that the auxiliary switch of my invention may be provided with two sets with two "A" contacts and two "B" contacts. As will be hereinafter more fully described, my novel switch can be arranged for any desired combination of contacts. Thus, for example, it can be assembled to have four "A" contacts, four "B" contacts; three "A" contacts and one "B" contact or one "A" contact and three "B" contacts. A cross-sectional view of the "B" and "A" contacts formed by bridging contact members 253 and 203, is seen in Figure 5.

The operation of the auxiliary switch is as follows: when the circuit breaker with which it is associated is moved from the closed to the open position, the cam operating shaft 16 is rotated in a counterclockwise direction. Due to the double key arrangement whereby the square cam operating shaft 16 is positioned within the cam members 104, 204, these two cam units will also be rotated within their respective columns in a counterclockwise direction. Since each of the cam members are seated within the rectangular area formed by the contact arms 100 and 200, these latter units will be driven to the position indicated in Figure 1.

When the cam operating shaft is moved clockwise, for example by movement of the circuit breaker from the open to the closed position, the cam members 104, 102 will be driven in a clockwise direction.

A comparison of Figures 1 and 11 will indicate the movement of the switch from a first position to a second position when the cam operating shaft 16 is driven counterclockwise.

In summary, it will be noted that I have invented a novel compact auxiliary switch in which a single operating unit provides positive drive for opening and closing four electrically independent circuits, each of which has double break.

The bridging contacts of inlaid silver are removable, replaceable and interchangeable and hence, can be readily and easily re-assembled for either "A" or "B" contact assembly. By providing a molded Bakelite base arrangement with appropriate channels and recesses, all of the various components can be readily and easily side mounted to facilitate assembly and reduce manufacturing costs, in like manner insuring that all of the bridging contacts 103, 153, 203, 253 are positioned within one plane. Thus, it will be apparent that all of the units are interchangeable. That is, by merely inverting the contact arm 100, it can be positioned as indicated by 200 and in like manner by inverting the contact arm 200, it can be positioned as indicated by 100.

It will be noted that the auxiliary switch has either an open or a closed position which ordinarily corresponds to the open or closed position of the circuit breaker with which it is associated. Thus, as noted, the "A" contacts of the switch such as 103, 203 will be open when the switch is in the first position representing the circuit breaker in the open position and the "B" contacts 153, 253 will be closed when the switch is in the closed position corresponding to the circuit breaker closed position (Figure 1).

Figure 12:
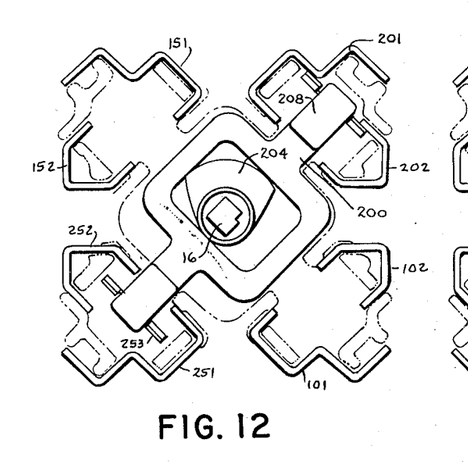
Figure 12 is a side view similar to Figure 1 with the upper contact arm removed.

After the cam operating shaft 16 has been rotated in a clockwise direction, thereby indicating that the circuit breaker is moved to a closed position, the "A" contacts will be closed and the "B" contacts will be open, as seen in Figure 11. Figure 12 is a view illustrating the position of the lower contact arm 200 when the switch is in the position of Figure 11 with the upper contact arm 100. Thus, it will be noted that even though the cam operating shaft 16 operates both the cam 104, 204, the respective contact arms 100, 200 are individually driven by their respective cams. This feature will hereinafter be more fully described in connection with the modification which includes a spring latch contact.

As heretofore noted, the bridging contact members such as 103, 153 and 203, 253 can be assembled in the contact arms in any desired manner so that they can be made of either an "A" or "B" contact depending on the required operation of the switch. This is achieved in the following manner. As best seen in the exploded perspective view of Figure 7, the contact arms 100 and 200 are respectively provided with contact sections 108, 158 and 208, 258. These contact sections have a rectangular recessed area to house contact pressure springs 109, 159 and 209, 259.

Figures 14, 15:
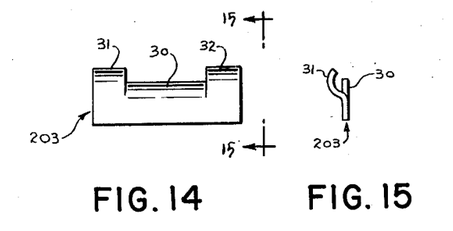
Figure 14 is a side view of the interchangeable and movable bridging contacts used in my novel auxiliary switch.
Figure 15 is a view taken in the direction of the arrows 15—15 of Figure 14 and illustrates the protruding portion of the bridging contact which permits a rolling action during contact engagement to provide wiping and self-cleaning action.
Figure 16:
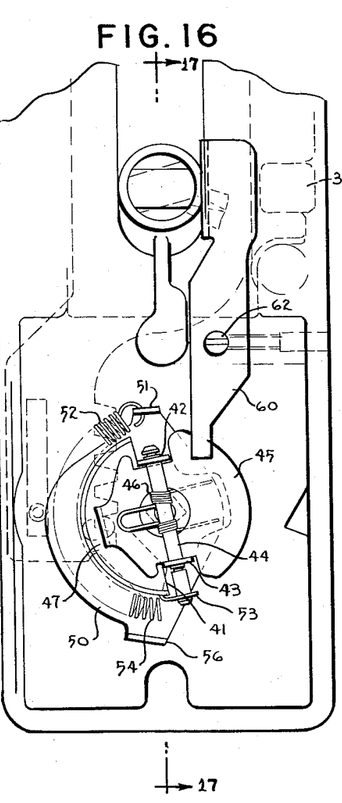
Figure 16 is a front view of the auxiliary switch mounted on an escutcheon plate and illustrates the spring loaded latch attachment and unlatching lever which may be provided to adapt the switch for non-operation of the alarm ringing circuit when the circuit breaker is intentionally opened. This figure illustrates the main operating shaft latched to the alarm ringing operating shaft when the circuit breaker has been automatically tripped.

The bridging contact is illustrated in Figure 14 and for the sake of simplicity this contact has been numbered 203. However, it will be noted that all of the bridging contacts 103, 153 and 203, 253 are identical in construction and thus are replaceable and interchangeable. It will be noted that this replaceable and removable interchangeable contact such as 203 is a copper unit with inlaid silver. This arrangement replaces the standard type of contact button and thus minimizes on the manufacturing costs and enables a great saving of space so that the switch may be a compact flat unit.

Thus, for example, the bridging contact section 203, as seen in Figure 14, has a section 30 which has a height equal to the height of the recessed section within the contact housing portion 208. Protruding sections 31 and 32 form a contact engaging portion of the bridging contact 203 and protrude forward and above the main section 30, as best seen in Figure 15.

The contact springs such as 209, 259 are provided with a tapered end 210, 260 which fit into a cut away portion 211, 261, respectively, in the contact arm 200. Thus, as best seen in the cross-sectional view of Figure 5 and in the exploded view of Figure 7, after assembly of the unit, the contact spring 209 will be firmly positioned by the seat of its tapered end 210 in the small recess 211 to thereby urge the bridging contact 203 in the direction of its co-operating stationary contact 201, 202. Thus, as the auxiliary switch is moved from the open position, corresponding to Figures 1 and 5, to the closed position, corresponding to Figures 11 and 12, the protruding parts 31 and 32 of the bridging contact 203 will be brought into contact engagement with the stationary contacts 201 and 202.

Figure 5A:
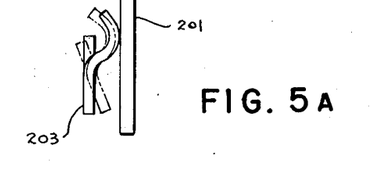
Figure 5a is a portional cross-sectional view similar to Figure 5 and illustrates the wiping or self-cleaning rolling motion of the bridging contact with its stationary contact after the switch has been moved from the position of Figure 5 to the position of Figure 11.

As best seen in Figure 5a, after the bridging contact 203 is engaged to stationary contacts 201 and 203, continued forward movement of the contact arm 200 will force the bridging contact 203 to come through a rolling action as illustrated by the dotted line as seen in Figure 5a to thereby create a wiping or self-cleaning operation during each closing operation. Also, this operation will further comprise a biasing spring 209 and thereby insure that contact engagement is maintained under a relatively high pressure.

As already noted, the bridging contact 203, as seen in Figures 1, 5, 11 and 12, is ordinarily designated as an "A" contact since it is normally open when the switch is in the open position. However, if it is desired to make this contact a "B" contact, such that it will be normally closed when the auxiliary switch is opened, it is merely necessary to re-assemble the contact spring 209 and the bridging contact 203 to the position seen in Figure 11. That is, both the contact spring 209 and the bridging contact 203 are turned a 180° and re-assembled in the contact portion 208 of the contact arm 200.

Figure 13:
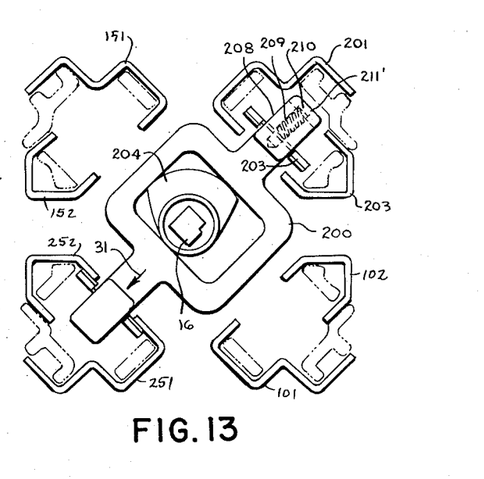
Figure 13 is a view similar to Figure 11 with the lower contact arm removed.
Figure 13A:
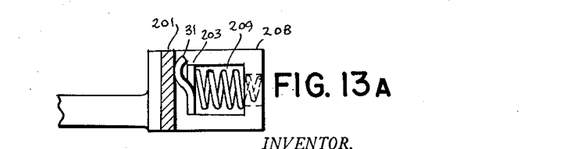
Figure 13a is a cross-sectional view of the cooperating contact 203 when the switch of Figure 13 is moved in the direction of the arrow 31.

An appropriate recess 211' is provided in the opposite end of the contact housing section 208 to provide a seat for the tapered end 210 of the contact spring 209. Thus, as seen in Figure 13, which represents the position of the bottom contact arm 200 when the auxiliary switch is in the closed position, the bridging contact 203 will be open and hence, is now designated at a "B" contact.

When the cam operating shaft 16 is rotated in a counterclockwise direction thereby rotating the cam 204 in a counterclockwise direction, the moving contact arm 200 will be moved in the direction of the arrows 31 and subsequently occupy the position indicated in Figures 1 and 5. This will correspond to the auxiliary switch open position. In this position, the bridging contact 203 when assembled has a "B" contact, as seen in Figure 13, and will now be in contact engagement with the stationary contacts 201, 203. The cam operating shaft is properly keyed to its associated cams so that mis-assembly thereof is impossible. Furthermore, the four contacts each of which has double break thus can be connected to auxiliary circuits in any desirable manner. Thus, for example, the switch can be used for duble circuits consisting of two single series circuits, each of which would have a total of four contact breaks.

Figure 9:
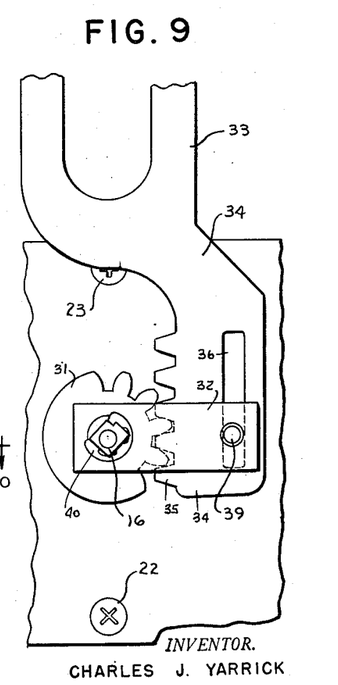
Figure 9 is a partial view similar to Figure 8 illustrating the position of the control parts for the cam operating shaft when the circuit breaker is in the open position.
Figure 10:
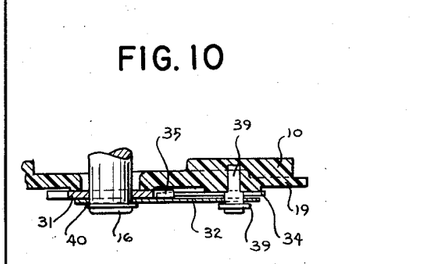
Figure 10 is a cross-sectional view taken in the direction of the arrows 10—10 of Figure 8 and illustrates the guide and control means for the slider rack.

One of the primary applications of my novel auxiliary switch is in connection with circuit breakers wherein the switch can be mounted on the escutcheon plate as illustrated in Figures 8 and 9. Screws 22 and 23 are used to mount the auxiliary switch 10 on the back of the escutcheon plate 30. For this arrangement it is merely necessary to provide an additional gear 31 to the auxiliary switch 10. Gear 31 is properly keyed to the cam operating shaft 16 so that this shaft can be driven from the gear 13. The escutcheon plate 30, which forms no part of my present invention is provided with a slider rack 33 which is detrimental in operating the visual indicating means indicated generally at 34.

To adapt a slider rack 33 so that it can serve the dual function of acting as an operating member for the visual indicator and also as a drive means for the auxiliary switch 10, it is merely necessary to provide an extension portion 34 containing a plurality of teeth 35 on one side thereof. An appropriate rectangular slot 36 in the extension 34 of the slider rack 33 is provided to fit over an extending pin 39 which is an integral part of the flat cover plate 19. Thus, the integral pin 39 extending from the flat cover 19, housed in the rectangular slot 36 in the extension 34 of the slider rack 33, will restrict movement of the rack 33 to vertical motion.

A guide 32 with openings at each end fits over the cam operating shaft 16 and the integral pin 39 to insure that the gear 31 and the teeth 35 of the slider rack 33 remain in engagement at all times. Appropriate holding means such as E rings 40 and 41 may be provided to hold the guide member 32 in place. When the circuit breaker (not shown) is in the closed or contact engaged position, the slider rack 33 will be in its extreme downward position as indicated in Figure 8. When the circuit breaker is in the open or contact disengaged position, the slider rack 33 will be in its uppermost position as indicated in Figure 9. Thus, it will be seen that when the auxiliary switch 10 is mounted on the escutcheon plate and the circuit breaker is moved to the open position, the cam operating shaft 16 will be rotated counterclockwise and hence, the various components of the switch will be moved to the position indicated as Figure 1.

When the circuit breaker is moved from the open to the closed position, thereby moving the slider rack 33 from its uppermost position to its lowermost position as indicated in Figure 8, the engagement of the gears 35 with the gear 31 will rotate the cam shaft 16 in a clockwise direction. As heretofore noted, this will cause a clockwise rotation of the cams 104 and 204 to thereby move the contact arm 100 and 200 to the position indicated in Figure 11.

It will be noted that in the arrangement heretofore noted, the operation of the cam operating shaft 16 in either a clockwise or counterclockwise direction will be effective to operate both contact arms 100 and 200 since the integral shaft 16 is connected to the driving cams 104, 204 of the contact arms 100, 200.

It will be, therefore, apparent to those skilled in the art that if it is necessary to operate more than four sets of contacts from a single circuit breaker that the auxiliary switch of my invention can be stacked in layers with a single cam operating shaft 16 operating all of the contacts. That is, two, three, or more units of the type shown in Figure 1-4 can be pancaked on top of each other and operated from a single operating cam shaft.

However, it is desirable to provide an auxiliary switch which is responsive to the manner in which its associated breaker has opened. Thus, for example, if one set of contacts of the auxiliary switch is connected to an alarm ringing circuit to indicate that the circuit breaker has been opened due to automatic trip, i. e., over current or fault current, it is undesirable to have the circuit energized when the circuit breaker is intentionally opened as for example by means of the operating handle or shunt trip.

However, in the arrangement of the auxiliary switch heretofore described, the integral shaft 16 will simultaneously operate both the cams 104 and 102 and their associated contact arms 100 and 200. Accordingly, since the switch only has two positions, corresponding to the circuit breaker open and closed position, the alarm ringing circuit will be energized whenever the circuit breaker is moved to the open position whether intentionally or due to automatic trip. In order to remedy this situation, I have provided a novel spring loaded latch arrangement and a dual cam operated shaft arrangement wherein the contacts connected to the alarm ringing circuit will not be effective when the circuit breaker is intentionally moved from the closed to the open position. However, if the circuit breaker is moved from the closed to the open position by automatic trip as a result of over current or fault current, the contacts associated with the alarm ringing circuit will be moved and hence, the alarm will ring.

This spring latch contact switch has the same dimension and construction as the switch heretofore described in connection with Figures 1 through 15 except for an additional spring loaded latch arrangement. This latch is set up or engaged when the cam operating shaft is rotated in a clockwise direction. That is, the latch is engaged when the circuit breaker is moved to the closed position as for example by means of the operating handle. However, reversing the motion of the handle so that it is moved in the trip direction or by energizing the shunt trip coil will cause a release of the latch to thereby reset only one cam so that the alarm ringing circuit will be ineffective when the circuit breaker is intentionally opened.

In this arrangement, the latch contact switch is also mounted on the rear of the escutcheon plate and the number of latch contacts per circuit breaker is limited to two contacts which are designated as "E" and/or "F." In the latch contact arrangement illustrated in Figures 16, 17, 18, 19 and 20, the latch couples the special alarm cam to the actuated shaft of the complete switch. With the latch in normal arrangement, the special alarm cam will follow the operation of a standard alarm cam. However, if the latch is disengaged due to intentional opening of the breaker, the special alarm cam will remain stationary. That is, by disengaging the latch due to rotation of the operating handle in a trip direction or by electrical operation of the shunt trip, the special latch contact arm molding will be held stationary when the circuit breaker opens through the medium of either a manual trip or by manual switching.

However, if the latch is not disengaged by either of these means, the special cam will rotate to either "make" or "break" a circuit and thus, it can be arranged in such a manner that this latch contact indicates a trip operation other than an intentional trip by the operator.

As heretofore noted, the switch construction for the spring latch contact arrangement is identical to that heretofore described in connection with Figures 1 through 15. The only modification required is that the operating shaft 16 be replaced by the spring latch mechanism as seen in the perspective view of Figure 20. This device is inserted in the back of the circuit breaker and in front of the auxiliary switch as illustrated in the said secondary view of Figure 17 and in the front view of Figure 16. The cam operating shaft comprises two sections 116 and 216. The cam operating shaft 116 operates the "A" or "B" contacts in a manner heretofore described and is directly connected to any drive mechanism for the auxiliary switch such as the slider rack 33.

This main operating shaft 116 is provided with an integral pin extension 40 which is secured to member 41. The member 41 has two protruding sections 42 and 43 to receive the latch pin 44. A latch 45 is positioned beneath the latch pin 44 and biased by the latch reset torsional spring 46 so that its latch end 47 will pass through the opening 48 of the member 41 and through the opening 49 of the latch member 50. The latched member 50 is provided with an extending ear 51 to which one end of an extension spring 52 is secured. The other end of the extension spring 52 is secured in the key way 53 of the latch pivot pin 44. A side wall 54 of the member 41 maintains the extension spring 52 in a semi-circular position, as best seen in the front view of Figure 16.

Figure 18:
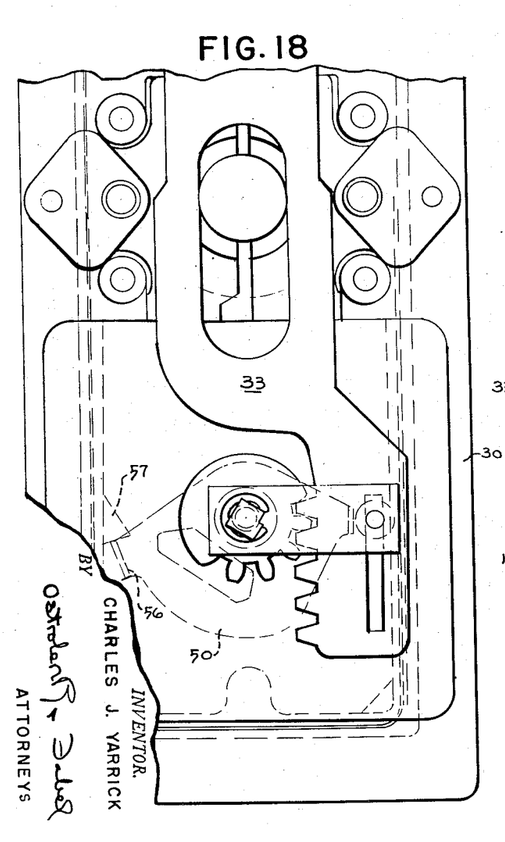
Figure 18 is a back view of the mounting of my novel auxiliary switch on the escutcheon plate showing the various parts when the circuit breaker is in a closed position.

It will be noted that the latched member 50 is also provided with an extension ear 66 which engages with a protrusion 67 on the escutcheon plate 30 to limit the clockwise rotation thereof, as best seen in Figure 18. The integral pin 40 extending from the main operating shaft 116 is permanently secured to the member 41. The latched member 50 is rotatably mounted on this extension pin 40 and has the alarm switch operating shaft 216 rigidly secured thereto. Hence, the latched plate and its associated alarm switch operating shaft 216 are independently rotatably mounted on the extension pin 40.

Due to the latching of the member 41 to the latched unit 50 by means of the extension 47 passing through the opening 48 and 49 of these two members as a result of the bias from the latch reset torsion spring 46, these two members will operate as a single unit. Hence, when the cam operating shaft 116 is driven in a clockwise direction (as seen in Figure 18), a motion will be transmitted from the main operating shaft 16 through the pin 40 to the member 41, through the extension 47 to the latch plate 50 and thereby transmitting it to the alarm spring operating shaft 216. Hence, when the circuit breaker is automatically tripped from the closed to an open position due to a fault or over current, the auxiliary switch 10 will move from the position indicated in Figure 11 to that indicated in Figure 1.

However, as heretofore noted, if the circuit breaker is intentionally moved from the closed to open position, it is not desirable to have the alarm ringing contacts, such as 203, 253, operate since it would be a false indication that a fault exists on a circuit. Hence, by providing means which will unlatch the alarm ringing operating shaft 216 from the main operating shaft 116, it will be possible to have the circuit breaker move from the closed to the open position without operation of the alarm ringing contacts. This is achieved as follows. An unlatching lever 60 which is pivoted at 62 is provided on the escutcheon plate 30. This unlatching lever 60 is rotated in a clockwise direction whenever the circuit breaker is intentionally opened either by operation of the handle or due to shunt trip. The manner in which the lever is rotated in a clockwise direction due to intentional trip is not shown in the drawings as it forms no part of my present invention.

Clockwise rotation of the unlatching lever 60 due to intentional trip will operate the latch 45 so that it rotates in a counterclockwise direction around the latch pivot pin 44 against the bias of the latch reset torsional spring 46. This operation will remove the extension 47 of the latch 45 from the opening 49 of the latched member 50. Since the latched member 50 is prevented from having further clockwise rotation when the auxiliary switch is in the second or closed position due to the engagement of its extension 56 with the protrusion 57, as seen in Figure 18, the release of the latch extension 47 from the opening 49 of this latched member 50 will permit rotation of only the main operating shaft 116 and its associated parts such as member 41, latch pivot pin 44 and latch 45 when the slider rack 33 is moved upwardly or to the open position.

That is, by removing the extension pin 47 of the latch 45 from the opening 49 of the latch plate 50, the alarm switch operating shaft 216 is rendered independent of the main operating shaft 116 and hence, when the circuit breaker moves from the open to the closed position, the contacts associated with the cam 204 (driven by the alarm switch operating shaft 216) will not be operated. This is best seen by a comparison of Figures 1 and 19.

In Figure 1, the circuit breaker has been automatically tripped and hence, the latch 45 latches the member 41 to the latch member 50 by means of the extension pin 47 and hence, the main operating shaft 116 and the alarm switching operating shaft 216 operate as a single unit. Accordingly, all of the contacts will be moved so that they will change from the indicated closed position of Figure 11 to the open position of Figure 1. However, if the circuit breaker is intentionally tripped, the unlatched lever 60 will be effective to disengage the alarm switch operating shaft 216 from the main operating shaft 116 and hence, even though the circuit breaker is moved from the open to the closed position, the alarm switch operating shaft 216 and its associated cam 204 will remain stationary. This is best seen by comparision of Figures 11 and 19.

Figure 11 shows contacts 153 and 253 opened and the contacts 103 and 203 closed when the circuit breaker is in a closed position. However, since the operating shaft 204 is rendered ineffective when the circuit breaker is intentionally tripped, its associated contact arm 200 and contacts 203, 253 remain stationary, as seen in Figure 19. Since the main operating shaft 116 is still connected to the main driving means, its associated cam 104 will be rotated. Hence, the other contact arm 100 and its associated contacts 103, 153 will be moved, as best seen by the comparison of Figures 11 and 19.

Accordingly, if the circuitry is so connected, the bridging contact 203 must be open and the bridging contact 253 closed in order for the alarm ringing circuit to operate, it will be apparent that when the switch assumes the position of Figure 19 due to the intentional opening of the circuit breaker, the alarm ringing circuit will not be energized. However, if the circuit is automatically tripped so that the contacts 23 are opened and the contacts 253 are closed, as seen in Figure 1, the alarm ringing circuit will be energized to thereby appraise the maintenance personnel that a fault exists on the line.

Thus, it will be seen that when the latch is not disengaged by the operating handle or the shunt trip, the alarm switch cam 204 will either rotate to make or break the alarm ringing circuit and thus indicate that a trip operation other than an intentional trip has occurred. On the other hand, if the latch 47 is disengaged by either the operating handle or shunt trip means, the alarm ringing cam operating shaft 216 and its associated cam 204 will be held stationary when a circuit breaker opens and an auxiliary switch is moved to the corresponding open position and hence, the alarm ringing circuit will not be energized.

Figure 17:
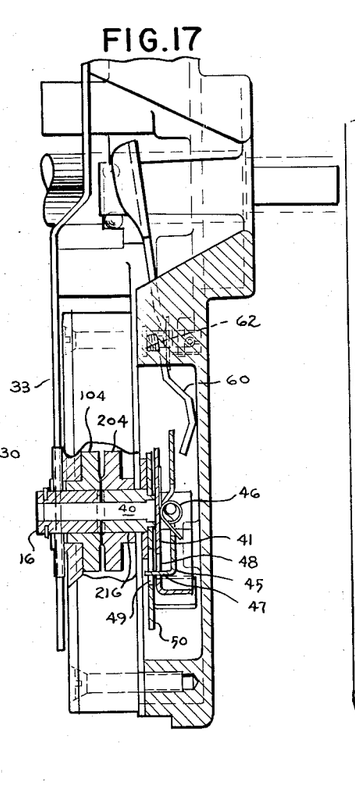
Figure 17 is a view taken in the direction of the arrows 17—17 of Figure 16 and shows a side sectional view of the spring loaded latch attachment on the auxiliary switch.

It will be noted that after the circuit breaker has been intentionally opened so that the latch is delatched, the subsequent reclosing of the circuit breaker will automatically reset the latch to the position seen in Figure 17.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An auxiliary switch assembly comprising a molded base having channels and recesses, a flat cover, terminal members, cams and contact arms; said terminal members side mounted in said channels of said base; said contact arms and said cams side mounted in said recesses of said base; said cams controlling the positioning and movement of said contact arms in one plane, said contact arms each having a bridging contact mounted at opposite ends thereof and positioned for engagement and disengagement with said terminal members, said bridging contacts and said terminal members forming four independent sets of cooperating contacts for said switch assembly, biasing means mounted within said contact arms to bias said bridging contacts in the direction said terminal means.

2. An auxiliary switch comprising terminal members, cams and contact arms; each of said cams associated with a contact arm; each of said cams positioned to provide positive drive for its said associated contact arm; driving means for each of said cams to transmit rotational motion thereto; each of said cams effective to cause planar movement for its said associated contact arm when said driving means imparts rotational movement thereto, said contact arms each having a bridging contact mounted at opposite ends thereof and positioned for engagement and disengagement with said terminal members, said bridging contacts and said terminal members forming four independent sets of cooperating contacts for said switch assembly, biasing means mounted within said contact arms to bias said bridging contacts in the direction said terminal means.

3. An auxiliary switch comprising a molded base having channels and recesses, a flat cover, terminal members, cams and contact arms; said terminal members side mounted in said channels of said base; said contact arms and said cams side mounted in said recesses of said base; each of said cams associated with a contact arm; each of said cams positioned to provide positive drive in two directions for its said associated contact arm, said contact arms having biasing means mounted within said arms; bridging contacts mounted on opposite ends of said contact arms; said biasing means being positioned to bias said bridging contacts toward said terminal members.

4. An auxiliary switch comprising a molded base having channels and recesses, a flat cover, terminal members, cams and contact arms; said terminal members side mounted in said channels of said base; said contact arms and said cams side mounted in said recesses of said base; each of said cams associated with a contact arm; each of said cams positioned to provide positive drive in two directions for its said associated contact arm; driving means for each of said cams to transmit rotational motion thereto, said contact arms having biasing means mounted within said arms; bridging contacts mounted on opposite ends of said contact arms; said biasing means being positioned to bias said bridging contact toward said terminal members.

5. An auxiliary switch comprising a molded base having channels and recesses, a flat cover, terminal members, cams and contact arms; said terminal members side mounted in said channels of said base; said contact arms and said cams side mounted in said recesses of said base; each of said cams associated with a contact arm; each of said cams positioned to provide positive drive for its said associated contact arm; driving means for each of said cams to transmit rotational motion thereto; each of said cams effective to cause planar movement for its said associated contact arm when said driving means imparts rotational movement thereto, said contact arms each having a bridging contact mounted at opposite ends thereof and positioned for engagement and disengagement with said terminal members, said bridging contacts and said terminal members forming four independent sets of cooperating contacts for said switch assembly, biasing means mounted within said contact arms to bias said bridging contacts in the direction said terminal means.

6. A flat auxiliary switch comprising a molded base having channels and recesses; terminal means side mounted in said channels of said base; bridging contact means for cooperation with said terminal means; said bridging contact means and said terminal means comprising four independent cooperating contacts; said bridging contact means being removably and replaceably positioned on contact arms; said bridging contact means assembled on said contact arms for either normally open or normally closed positioning with respect to said terminal means; said bridging contact means comprising a substantially rectangular member having two protruding sections; spring means mounted within said contact arms to bias said two protruding sections of said bridging contact in the direction of said cooperating terminal means.

7. A flat auxiliary switch comprising a molded base having channels and recesses; cams; terminal means side mounted in said channels of said base; bridging contact means for cooperation with said terminal means; said bridging contact means and said terminal means comprising four independent cooperating contacts; said bridging contact means being removably and replaceably positioned on contact arms; a cam associated with said contact arm; said cam positioned to provide positive drive for its associated contact arm; said bridging contact means assembled on said contact arms for either normally open or normally closed positioning with respect to said terminal means; said bridging contact means comprising a substantially rectangular member having two protruding sections; spring means mounted within said contact arms to bias said two protruding sections of said bridging contact in the direction of said cooperating terminal means; said protruding means of said bridging contact effective to cause a wiping action when said cams drive said bridging contact into engagement with said terminal means through said contact arms.

8. An auxiliary switch comprising a molded base having channels and recesses, a flat cover, terminal members, cams and contact arms; said terminal members side mounted in said channels of said base; said contact arms and said cams side mounted in said recesses of said base; bridging contacts removably mounted on said contact arms; said bridging contacts mounted on said contact arms for either normally open or normally closed relationship with said terminal members without changing the position of said terminal members; said bridging members creating a double break when driving in two directions from engaged to disengaged position with said terminal members by said cam through said contact arms, said contact arms having biasing means mounted within said arms; bridging contacts mounted on opposite ends of said arms; said biasing means being positioned to bias said bridging contacts toward said terminal members.

9. An auxiliary switch having a first and second position comprising a first and second cams, a first and second contact arm and terminal members; two contacts carried by each of said contact arms; said terminal members being stationary contacts for engagement by said contacts of said contact arms; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition.

10. An auxiliary switch having a first and second position comprising a first and second cam and a first and second contact arm; said first cam associated with said first contact arm; said second cam associated with said second contact arm; a first cam operating shaft for said first cam; a second cam operating shaft for said second cam; a latching means to latch said first and second cam operating shaft when said auxiliary switch is moved to said second position; said auxiliary switch operated from drive means secured to said first cam operating shaft; said driving means motion transmitted from said first cam operated shaft to said second cam operating shaft through said latching means.

11. An auxiliary switch having a first and second position comprising a first and second cam and a first and second contact arm; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition; said latching means remaining latched when said auxiliary switch is moved from said second position to said first position due to a first predetermined condition; said latching means unlatched when said auxiliary switch is moved from said second position to said first position due to a second predetermined condition.

12. An auxiliary switch having a first and second position comprising a first and second cam and a first and second contact arm; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition; means to unlatch said latching means; unlatching of said latching means by said means effective to render said second operating shaft independent of said first cam operating shaft; said means effective to delatch said latching means due to predetermined condition.

13. An auxiliary switch having a first and second position comprising a first and second cam and a first and second contact arm; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition; means to unlatch said latching means; unlatching of said latching means by said means effective to render said second operating shaft independent of said first cam operating shaft; said means effective to delatch said latching means due to a predetermined condition; said latching means comprising two members connected together by spring means; delatching of said latching means effective to permit movement of one of said members with respect to another of said members due to said spring.

14. An auxiliary switch having a first and second position comprising a molded base having channels and recesses, terminal members, a first and second cam and a first and second contact arm; said terminal members side mounted in said channels of said base; said first and second contact arm and said first and second cam side mounted in said recesses of said base; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition.

15. An auxiliary switch having a first and second position comprising a molded base having channels and recesses, terminal members, a first and second cam and a first and second contact arm; said terminal members side mounted in said channels of said base; said first and second contact arms and said first and second cams side mounted in said recesses of said base; said first cam associated with said first contact arm; said second cam associated with said second contact arm; a first cam operating shaft for said first cam; a second cam operating shaft for said second cam; a latching means to latch said first and second cam operating shaft when said auxiliary switch is moved to said second position; said auxiliary switch operated from drive means secured to said first cam operating shaft; said driving means motion transmitted from said first cam operated shaft to said second cam operating shaft through said latching means.

16. An auxiliary switch having a first and second position comprising a molded base having channels and recesses, terminal members, a first and second cam and a first and second contact arm; said terminal members side mounted in said channels of said base; said first and second contact arms and said first and second cams side mounted in said recesses of said base; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition; said latching means remaining latched when said auxiliary switch is moved from said second position to said first position due to a first predetermined condition; said latching means unlatched when said auxiliary switch is moved from said second position to said first position due to a second predetermined condition.

17. An auxiliary switch having a first and second position comprising a molded base having channels and recesses, terminal members, a first and second cam and a first and second contact arm; said terminal members side mounted in said channels of said base; said first and second contact arms and said first and second cams side mounted in said recesses of said base; said first cam associated with said first contact arm; said second cam associated with said second contact arm; a first cam operating shaft for said first cam; a second cam operating shaft for said second cam; latching means to latch said first and second cam operating shaft when said auxiliary switch is moved to said second position; means to unlatch said latching means when said auxiliary switch is moved from said second position to said first position due to a predetermined condition; means to unlatch said latching means; unlatching of said latching means by said means effective to render said second operating shaft independent of said first cam operating shaft; said means effective to delatch said latching means due to predetermined conditions.

References Cited in the file of this patent

UNITED STATES PATENTS

| | | |
|---|---|---|
| 1,709,068 | Forseille | Apr. 16, 1929 |
| 2,100,722 | Paulson et al. | Nov. 30, 1937 |
| 2,419,072 | Hall | Apr. 15, 1947 |
| 2,535,161 | Robbins | Dec. 26, 1950 |

FOREIGN PATENTS

| | | |
|---|---|---|
| 603,062 | Great Britain | June 8, 1949 |